United States Patent [19]

Ollivier et al.

[11] Patent Number: 5,379,112
[45] Date of Patent: Jan. 3, 1995

[54] PROCESS FOR RELATIVE MEASUREMENT OF THE CENTER-LINE OF AN APERTURE AND THE CENTER-LINE OF A CYLINDRICAL OUTLINE

[75] Inventors: Jean-Francais Ollivier, Merdrignac; Said Lalaouna, La Ferte Bernard; Manuel Penha, Le Mans, all of France

[73] Assignee: Framatome Connectors International, Paris La Defense, France

[21] Appl. No.: 35,764

[22] Filed: Mar. 24, 1993

[30] Foreign Application Priority Data

Mar. 26, 1992 [FR] France ................ 92 03657

[51] Int. Cl.⁶ .......................... G01B 5/14; G01B 5/24
[52] U.S. Cl. ...................................... 356/150; 356/153
[58] Field of Search .............. 356/150, 153, 386, 387, 356/376, 372, 377; 385/70, 135

[56] References Cited

U.S. PATENT DOCUMENTS

| | | | |
|---|---|---|---|
| 4,521,112 | 6/1985 | Kuwabara et al. | 356/387 |
| 4,732,486 | 3/1988 | Rinn | 356/386 |
| 4,968,114 | 11/1990 | Thillays | 350/320 |

FOREIGN PATENT DOCUMENTS

| | | |
|---|---|---|
| 2533710 | 3/1984 | France . |
| 2065300 | 6/1981 | United Kingdom . |
| 2160654 | 12/1985 | United Kingdom . |
| 2200456 | 8/1988 | United Kingdom . |

*Primary Examiner*—Role Hille
*Assistant Examiner*—Alexander Oscar Williams
*Attorney, Agent, or Firm*—Banner, Birch, McKie & Beckett

[57] ABSTRACT

This invention relates to a process for measurement of the relative positions of the center-lines of an aperture and of a cylindrical outline of a sample.

The process includes the following steps:

introducing a calibrated rod into said aperture;

performing measurements to define at least a pair of segments representative of the mid-points of the cylindrical outline and of a calibrated rod respectively.

The measurements are performed utilizing a light beam which is scanned parallel to the beam in a direction perpendicular to the center-line of the cylindrical outline. This enables measurement of the coaxiality and/or of the concentricity of the center-line of the outline and of the aperture.

20 Claims, 2 Drawing Sheets

PROCESS FOR RELATIVE MEASUREMENT OF THE CENTER-LINE OF AN APERTURE AND THE CENTER-LINE OF A CYLINDRICAL OUTLINE

BACKGROUND OF THE INVENTION

The present invention relates to a process for measurement of the relative positions of the center-lines of an aperture and of a cylindrical outline of a sample, in particular a ferrule (or collet) for an optical fiber connector and which in particular enables measurement to be made of the coaxiality and/or the concentricity of said center-lines.

Ferrules for optical fiber connectors have an external outline of nominal diameter 2500 microns (+ or −1 micron) and an aperture which is coaxial to the external outline and which presents a general nominal diameter of 125 microns. The performances of optical fiber connectors depend in particular on the precision with which the aperture is positioned relative to the reference cylindrical outline. Given the tolerances mentioned above and the level of performance required for such connectors, the requirements of accuracy for the measurement of concentricity and/or of coaxiality are themselves high since the readings of the positions of the center-lines must be performed with an accuracy better than a micron.

DESCRIPTION OF THE PRIOR ART

The ratio of the diameters of the aperture and of the external outline being high, in the order of 20 for a ferrule, currently known optical control means are not capable of magnifying both diameters with the same objectives. Indeed, the performance of such a measurement would imply a change of objective introducing inaccuracies which would add up with the tolerances of the tables of movement of the measurement bench, and would result in a level of accuracy which is incompatible with the accuracy desired.

Moreover, standard measurement means using microprobes are not desirable for making measurements on plastic materials because of the insufficient surface hardness. Thus, the contact of the microprobe on the surface produces a depression of the order of some microns which completely destroys the accuracy of measurement.

OBJECTS OF THE INVENTION

An object of the present invention is to provide a measurement process avoiding the above disadvantages and which, without any particular complication, enables measurements to be made of concentricity and/or of coaxiality with high accuracy, in particular better than a micron, while being compatible with automation of the process.

DESCRIPTION OF THE INVENTION

The present invention provides a process for measurement of the relative positions of the center-lines of an aperture and a cylindrical outline of a sample, characterized in that it comprises the following steps:
  introducing a calibrated rod into said aperture;
  performing measurements to define at least a pair of segments representative of the mid-points of the cylindrical outline and of the calibrated rod respectively.

These measurements may be made using a light beam which is scanned parallel to the beam in a direction perpendicular to the center-line of the cylindrical outline to define the outermost points of the cylindrical outline and a step of defining said mid-points.

In a preferred embodiment, the process includes a step of warming the sample so as to expand substantially said aperture before introduction of the standard rod and cooling the sample, so that the rod is assembled with close fit in said aperture.

In this way, it is certain that the calibrated rod is not loose in the aperture and that a center-line is therefore practically coincident with the center-line of the aperture.

The process may include a step of evaluating the coaxiality by calculating the angle between two segments of a given pair of segments.

The process may include a step of defining the position of an end plan of the sample comprising said aperture and a step of evaluating the concentricity by calculating the positional distance between two segments of a given pair at the end of the sample.

The process may include a plurality of series of measurements for defining a plurality of said pairs of segments for different angular deviations of the sample about the center-line of its cylindrical outline.

DESCRIPTION OF THE DRAWINGS

Other features and advantages of the invention will appear from the following description, given by way of non-limiting example, with reference to the drawings which show.

DESCRIPTION OF THE PREFERRED EMBODIMENTS

Figure 1:
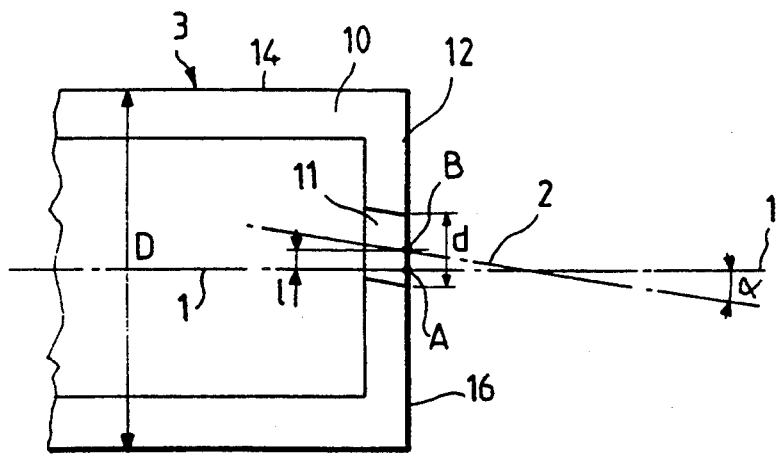
FIG. 1 is an enlarged sectional view of the front end of a sample measured.
Figure 2:
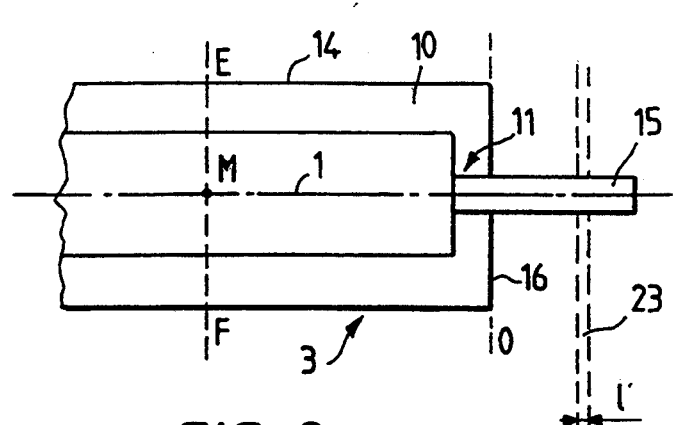
FIG. 2 is a sectional view of a sample with an aperture into which a calibrated rod has been introduced.

As shown in FIG. 1, a sample to be measured 3 has a cylindrical portion 10 whose reference external outline 14 has a diameter D, as well as a front end 12 forming an aperture 11 of diameter d. The cylindrical outline 14 has a longitudinal center-line 1 which intercepts the front plan 16 of the end 12 at a point A. The opening 11 has a longitudinal center-line 2 which intercepts the end plan 16 at a point B. The center-lines 1 and 2 form an angle between them of alpha representing the coaxiality of the center-lines 1 and 2. The distance 1 between the points A and B represents the concentricity between the center-lines 1 and 2. In FIG. 1, in order to clarify the drawing, it will be understood that the concentricity and coaxiality defects have been exagerated.

In order to perform a measurement in accordance with the invention, a calibrated rod 15 is placed in the aperture 11 so that it projects forwardly of the sample 3, by a distance of 5 to 7 mm.

Measurement is next made of an outermost points E and F of the outline 14 of the cylindrical portion 10 and of the calibrated rod 15 using a dimensional measurement bench of the laser shadowscope type which is known per se and so under the name LASERMIKE by the company ORC at F-77680 ROISSY-EN-BRIE, and especially model 183-100 comprising a helium-neon laser providing a beam 23 of wavelength 632.8 mm and forming a planar beam of a given height due to the use of a rotating mirror and collimator lenses not shown. The control bench comprises a base part 25 presenting a reference surface 26 having the shape of a V extending in a direction longitudinal to the base part 25, and a transfer slot 27 enabling the laser radiation to pass when the reference outline 14 of a sample 3 whose parameters are to be measured is positioned in the V-shape groove, so that its center-line 1 is perpendicular to the beam 23.

The introduction of a sample 3 creates a shadow segment which generates an electrical signal whose duration is proportional to the dimension of the object to be measured, this duration being related to the scanning-speed of the laser beam 23. The electrical signal is decoded and enables the diameter of the sample to be obtained, and also the position of the outermost points E and F by detecting the moments when the beam 23 is masked by the sample 3. The resolution is of the order of 0.2 micron.

Figure 3:
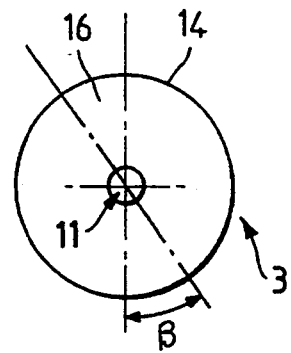
FIG. 3 is a view of the front end of a sample.
Figure 4:
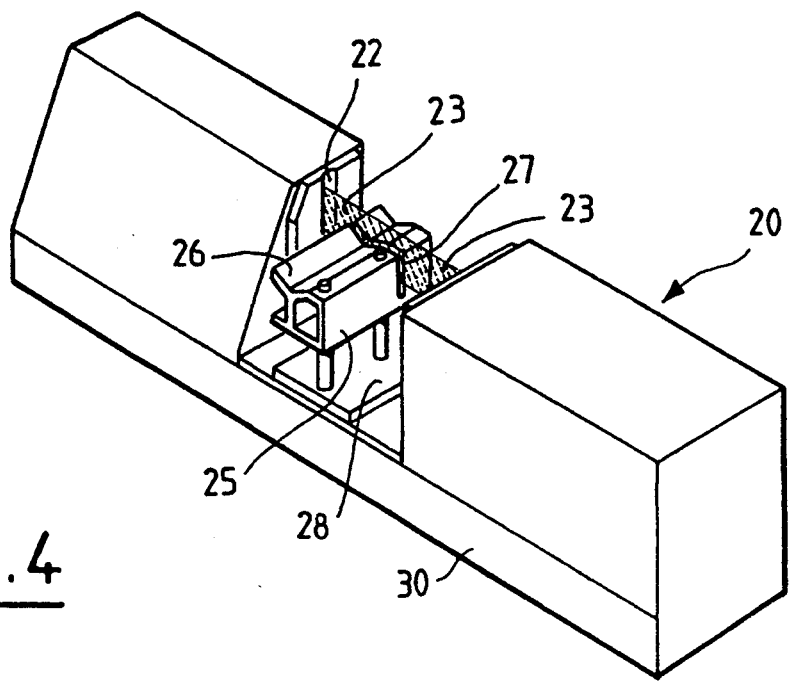
FIG. 4 shows an optical measurement bench of the kind having a planar light beam.

Measurement of the position of the center-line 1 is performed by making a certain number of measurements along the cylindrical outline 14 and by tracing the segment corresponding to the mid-point M of the segments E and F. Similar measurement for the center-line 2 of the aperture 11 is performed through which a segment is defined consisting of the mid-points of the segments E and F defined along the cylindrical rod 15. Series of measurements can be repeated for different values of the angle $\beta$ (see FIG. 3) so as to give additional information on the angles $\beta$ for which the coaxiality and/or the concentricity errors are present.

Figure 5:
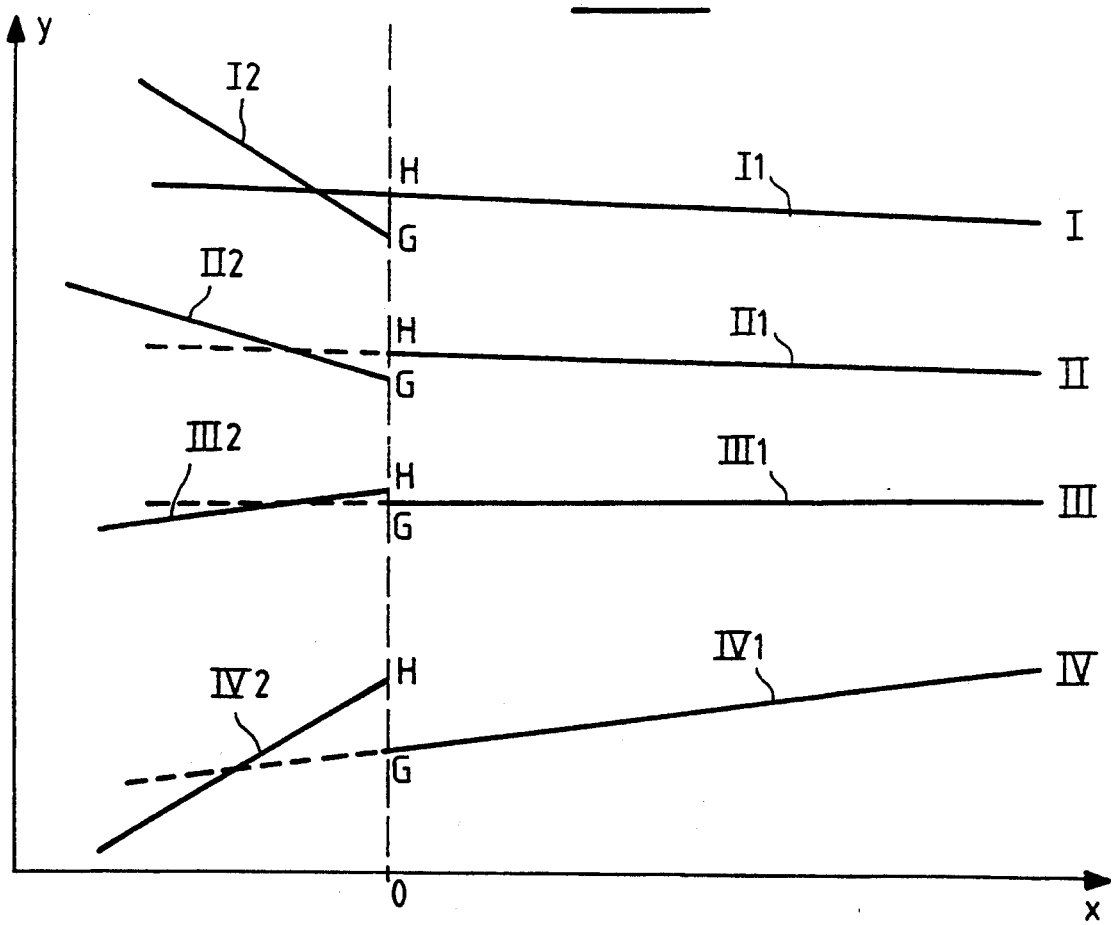
FIG. 5 is a diagram illustrating pairs of measurement segments for different angular positions of a sample.

Thus, traces are obtained of pairs of segments of curves (I1, I2), (II1, II2), (III1, III2), (IV1, IV2) shown in FIG. 5. Here the horizontal axis represents the position of the measurement point in the direction longitudinally along the sample and the rod, and vertical absciss represents the position of the center-lines. The curves I, II, III and IV correspond to different values of the angle $\beta$.

The shadowscope laser apparatus also enables the point 0 to be defined corresponding to the end plan 16 of the sample 3 through which a discontinuity is observed in the value of diameter measured. In particular, to improve the accuracy of defining this point 0, it is preferred to utilize a beam 23 whose width 1 is reduced (for example of the order of 20 microns). Top and bottom precision rods reducing the height of the beam and causing sharp interruptions of the beam may be utilized to improve the accuracy of defining the axis of the ferrule.

The value of coaxiality is defined directly on the graphs of FIG. 5 by the angle formed between the two segments of a given pair, taking account of course of the enlarged vertical scale.

The value of concentricity is given by the length of the segments G and H for the point 0 on the horizontal axis corresponding to the end plan 16.

Series of measurements may be performed by rotating the sample 3 through an angle $\beta$ of a few degrees between each series of measurements, until a maximum deviation of coaxiality and/or concentricity is defined. The angles ($\beta_0$, $\beta_1$) are thus identified at which each type of fault is directed. It is also possible to calculate the angles $\beta_0$ and $\beta_1$ using a number of series of measurements.

Figure 6A:
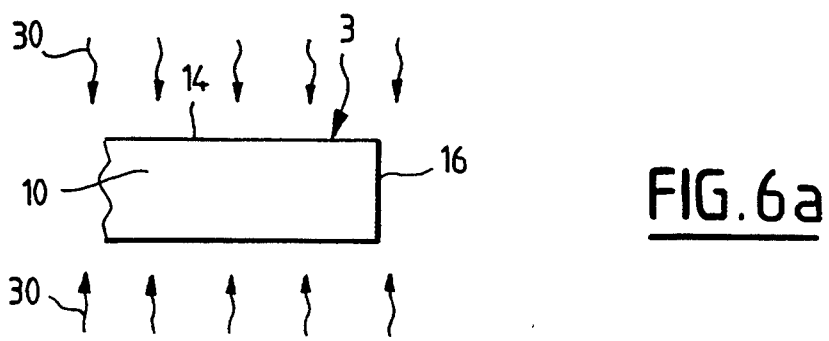
FIGS. 6a and 6b illustrate the stages of heating a sample, and introducing a calibrated rod into the aperture of the sample.
Figure 6B:
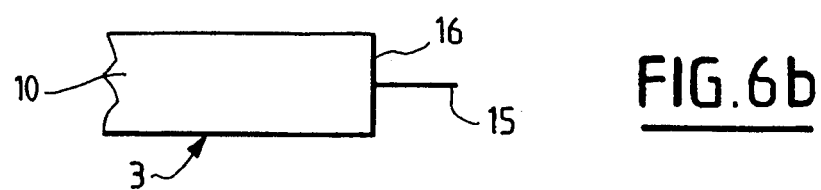

Optimum accuracy is obtained when the rod 15 is fitted without play in the aperture 11 of the ferrule 3. To this end, the ferrule 3 (FIG. 6a) is warmed up gently (at 30), in order to expand by a few tens of microns the diameter of the aperture 11 and the standard rod 15 is then placed (FIG. 6b) in the aperture 11 of the ferrule 3.

Subsequently, the assembly is allowed to cool down to ambient temperature and the outer diameter 14 of the ferrule 3 is again checked to check that its value is the same as before expansion.

It will be noted in addition that the rotational measurements accept a degree of perpendicularity error between the ferrule and the beam since the measurements are relative measurements and in addition, the minima and the maxima are summed for each position.

It will be understood that the above description of a preferred embodiment is given purely by way of non-limitative example, and many variance and modifications thereto will be apparent to those skilled in the art, without departing from the scope of the present invention, which is defined in the following claims.

What is claimed is:

1. A process for measurement of the relative positions of the center-lines of an aperture and a cylindrical outline of a sample characterized in that it comprises the following steps:
   introducing a calibrated rod into said aperture;
   performing measurements to define at least a pair of segments (I–IV) representative of the mid-points of the cylindrical outline and of the calibrated rod respectively.

2. A process as claimed in claim 1, characterized in that said measurements include a step of utilizing a light beam which is scanned parallel to the beam in a direction perpendicular to the center-line of the cylindrical outline to define the outermost points (E, F) of the cylindrical outline and a step of defining said mid-points (M).

3. A process as claimed in claim 1, characterized in that it includes a step of warming the sample so as to expand substantially said aperture before introduction of the calibrated rod and cooling the sample, so that the rod is assembled with close fit in said aperture.

4. A process as claimed in any one of claim 1, characterized in that it comprises a step of evaluating the coaxiality by calculating the angle between two segments of a given pair of segments (I1, I2).

5. A process as claimed in claim 1, characterized in that it comprises a step of defining the position of an end plan of the sample comprising said aperture and a step of evaluating the concentricity by calculating the positional distance (GH) between two segments of a given pair (I1, I2) at the end of the sample.

6. A process according to claim 1, characterized in that it comprises a plurality of series of measurements for defining a plurality of said pair of segments (I1, I2, II1, II2, III1, III2, IV1, IV2) for different angular deviations ($\beta$) of the sample about the center-line of its cylindrical outline.

7. A process according to claim 1, characterized in that said sample is a ferrule for a fiber optical connector.

8. A process as claimed in claim 2, characterized in that it includes a step of warming the sample so as to expand substantially said aperture before introduction of the calibrated rod and cooling the sample, so that the rod is assembled with close fit in said aperture.

9. A process as claimed in claim 2, characterized in that it comprises a step of evaluating the coaxiality by calculating the angle between two segments of a given pair of segments (I1, I2).

10. A process as claimed in claim 3, characterized in that it comprises a step of evaluating the coaxiality by calculating the angle between two segments of a given pair of segments (I1, I2).

11. A process as claimed in claim 2, characterized in that it comprises a step of defining the position of an end plan of the sample comprising said aperture and a step of evaluating the concentricity by calculating the positional distance (GH) between two segments of a given pair (I1, I2) at the end of the sample.

12. A process as claimed in claim 3, characterized in that it comprises a step of defining the position of an end plan of the sample comprising said aperture and a step of evaluating the concentricity by calculating the positional distance (GH) between two segments of a given pair (I1, I2) at the end of the sample.

13. A process as claimed in claim 4, characterized in that it comprises a step of defining the position of an end plan of the sample comprising said aperture and a step of evaluating the concentricity by calculating the positional distance (GH) between two segments of a given pair (I1, I2) at the end of the sample.

14. A process according to claim 2, characterized in that it comprises a plurality of series of measurements for defining a plurality of said pair of segments (I1, I2, II1, II2, III1, III2, IV1, IV2) for different angular deviations ($\beta$) of the sample about the center-line of its cylindrical outline.

15. A process according to claim 3, characterized in that it comprises a plurality of series of measurements for defining a plurality of said pair of segments (I1, I2, II1, II2, III1, III2, IV1, IV2) for different angular deviations ($\beta$) of the sample about the center-line of its cylindrical outline.

16. A process according to claim 4, characterized in that it comprises a plurality of series of measurements for defining a plurality of said pair of segments (I1, I2, II1, II2, III1, III2, IV1, IV2) for different angular deviations ($\beta$) of the sample about the center-line of its cylindrical outline.

17. A process according to claim 5, characterized in that it comprises a plurality of series of measurements for defining a plurality of said pair of segments (I1, I2, II1, II2, III1, III2, IV1, IV2) for different angular deviations ($\beta$) of the sample about the center-line of its cylindrical outline.

18. A process according to claim 2, characterized in that said sample is a ferrule for a fiber optical connector.

19. A process according to claim 3, characterized in that said sample is a ferrule for a fiber optical connector.

20. A process according to claim 4, characterized in that said sample is a ferrule for a fiber optical connector.

* * * * *

UNITED STATES PATENT AND TRADEMARK OFFICE
CERTIFICATE OF CORRECTION

PATENT NO.  : 5,379,112
DATED       : January 3, 1995
INVENTOR(S) : Ollivier et al It is certified that error appears in the above-indentified patent and that said Letters Patent is hereby corrected as shown below:

Title page, item [75], the first inventor's name is in error. "Jean-Francais" should be --Jean-Francois--.

Signed and Sealed this

First Day of August, 1995

Attest:

BRUCE LEHMAN

*Attesting Officer*     *Commissioner of Patents and Trademarks*